Oct. 31, 1961 J. V. BATLEY 3,007,115
TRANSFER CIRCUIT
Filed Dec. 26, 1957 2 Sheets-Sheet 1

INVENTOR.
JAMES V. BATLEY
BY George Baron
ATTORNEY

3,007,115
TRANSFER CIRCUIT

James V. Batley, Poughkeepsie, N.Y., assignor to International Business Machines Corporation, New York, N.Y., a corporation of New York Filed Dec. 26, 1957, Ser. No. 705,289
6 Claims. (Cl. 328—42)

This invention relates to pulse transfer circuits and more particularly to circuits for causing two-way signal transfer between adjacent flip-flops or similar bistable devices.

In prior transfer circuits coupling two bistable devices, a first bistable device to which a desired signal pulse is to be transmitted is set in one bistable state. The second bistable device is sensed and is such second bistable device is in a bistable state other than that of the first bistable device, the bistable device to which the signal is to be transferred is then set to the other state. If desired, the bistable device which is storing the signal to be transferred can be sensed as to what state it is in, and if it is in a predetermined state, the signal is transferred to set the other bistable device into a desired state. Where unidirectional transfer between two bistable devices takes place, two sensing gate circuits are required. Where bidirectional transfer between two bistable devices is desired, four sensing gate circuits are required.

The present invention relies upon an "exclusive OR" circuit as the sensing means for the two bistable devices. The "exclusive OR" circuit is interposed between each pair of bistable devices in such a manner that when the bistable devices are sensed, the bistable device to which the desired signal is to be transferred is complemented. The use of an "exclusive OR" circuit as a means for sensing as well as for changing the states of two bistable devices serviced by the same transfer loop will permit fewer gating circuits, more rapid transfer of signals between the bistable devices, and a more favorable loading of such bistable devices than was heretofore known. Moreover the novel transfer loop has special advantages when utilized in computer circuits, particularly in those computer systems that have two computers operating simultaneously, one acting as a check on the other.

It is an object of this invention to provide an improved transfer circuit.

It is a further object to utilize the same transfer circuit to permit a single transfer of signal information in either direction or in both directions at once.

It is yet a further object to utilize an "exclusive OR" gate in a transfer circuit in a novel manner so as to diminish the number of electrical components heretofore required in a transfer circuit coupling two bistable devices.

A still further object is to provide such novel transfer circuits in combination with other computer components so as to enable one to make more efficient use of such computer components.

Other objects on this invention will be pointed out in the following description and claims and illustrated in the accompanying drawings which disclose, by way of example, the principle of the invention and the best mode which has been contemplated, of applying that principle.

Figure 1:
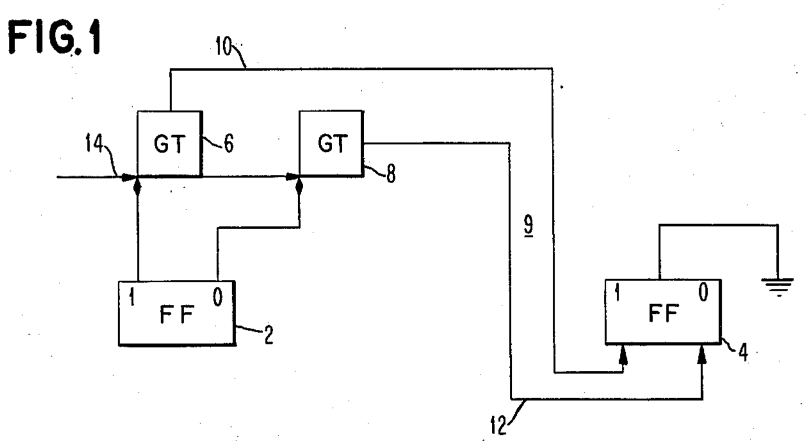
FIGS. 1, 2 and 3 are exemplary logic circuits of prior art transfer circuits coupling two bistable devices.

Referring to FIG. 1, there are shown two conventional flip-flops 2 and 4, respectively, each of which is capable of assuming one of two stable states, each state generally referred to as a "0" and a"1" state. Gates 6 and 8 lie in a transfer circuit 9 that couples flip-flop 2 to flip-flop 4. When flip-flop 2 is in its "1" state, gate 6 is primed to pass signal pulses or D.C. levels along its output conductor 10. When flip-flop 2 is in its "0" state, gate 8 is primed to pass signal pulses or D.C. levels along its output conductor 12. Input terminal 14 is adapted to receive input signal pulses for sampling the conditions of gates 6 and 8. In operating the prior art circuit of FIG. 1, information is transferred from flip-flop 2 to flip-flop 4 by applying a sampling pulse to input terminal 14 so as to simultaneously sample both gates 6 and 8. If flip-flop 2 is in its "1" state, gate 6 is open, permitting the sampling pulse applied to such gate 6 to pass through conductor 10 to set flip-flop 4 to its "1" state. Were flip-flop 2 in its "0" state, the sampling pulse applied at input terminal 14 would find gate 6 closed but gate 8 opened and would pass through gate 8 and along conductor 12 to set the flip-flop 4 to its "0" state. It is readily seen that the circuit of FIG. 1 relies upon two gates and a single sampling pulse time to carry out unilateral transfer of binary information from one bistable device to another.

Figure 2:
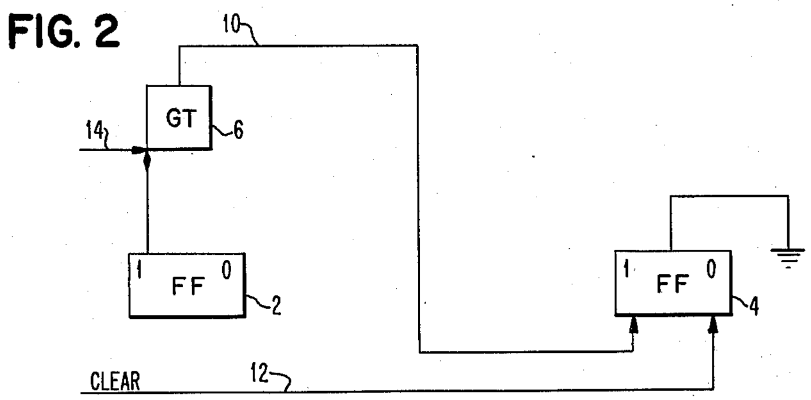

FIG. 2 represents another prior art circuit which attains unilateral transfer of binary information, but relies upon only one gate and two sampling pulse times to attain such unilateral transfer. Consequently gate 6 is primed only when flip-flop 2 is in its "1" state. Transfer of binary information from flip-flop 2 to flip-flop 4 is preceded by a clear pulse being applied to flip-flop 4 along conductor 12, such clear pulse setting flip-flop 4 to its "0" state. As soon as the clear pulse terminates and flip-flop 4 settles down to its "0" state, a sampling pulse is applied at input terminal 14. If flip-flop 2 is in its "1" state, gate 6 is primed and the sampling pulse passes along conductor 10′ to set flip-flop 4 to its "1" state. If flip-flop 2 is in its "0" state at the time that a sampling pulse is applied to gate 6, gate 6 is closed, preventing the passage of the sampling pulse to flip-flop 4, leaving the latter in its cleared or "0" state.

A comparison of the prior art circuits of FIG. 1 and FIG. 2 will show that the former circuit employs a single sampling pulse time but two gates to effect unilateral transfer of binary information, whereas the latter utilizes one gate but two pulse times to effect unilateral binary transfer of information.

Figure 3:
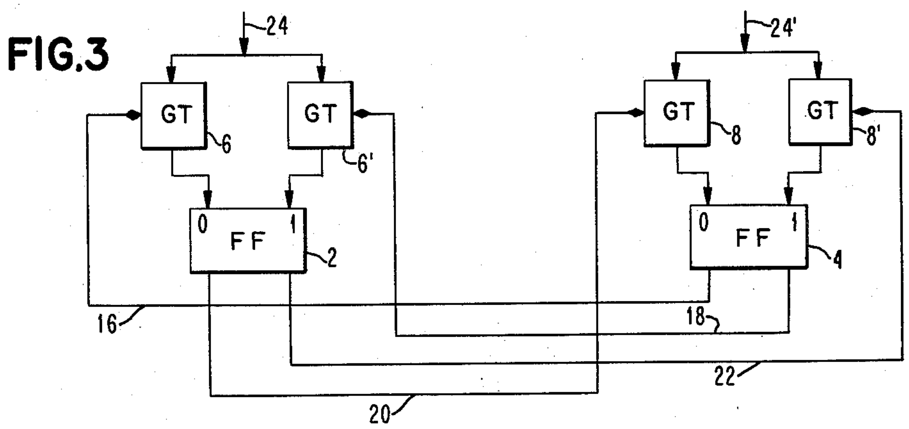

In FIG. 3, there is shown an example of a prior art bilateral transfer circuit wherein four gates are employed to attain bilateral transfer of binary information during a single sampling pulse interval. Gate 6 is primed by the "0" output terminal of flip-flop 4 through conductor 16 and gate 6′ is primed by the "1" output terminal of the same flip-flop 4 through conductor 18. Gate 8, associated with flip-flop 4, is primed by the "0" output terminal of flip-flop 2 through conductor 20 and gate 8′ is primed by the "1" output terminal of flip-flop 2, through conductor 22.

If it is desired to interchange the binary information in flip-flops 2 and 4, a sampling pulse is applied at input terminals 24 and 24′ so as to simultaneously sense the gates 6, 6′, 8 and 8′. It can be seen that the contents of the flip-flops 2 and 4 are interchanged when the states of the latter flip-flops are different. Thus, when flip-flop 2 is in its "0" state, gate 8 is primed to pass sampling pulses that appear at input terminal 24′, and when flip-flop 4 is in its "1" state, gate 6′ is primed to pass sampling pulses that appear at input terminal 24. When sampling pulses are simultaneously applied at input terminals 24 and 24′, gate 6′ is primed to pass a sampling pulse to switch flip-flop 2 to its "1" state whereas gate 8 is primed to pass a sampling pulse to switch flip-flop 4 to its "0" state, completing the interchange of information from one bistable device to the other. It can be seen that if flip-flop 2 were in its "1" state and flip-flop 4 in its "0" state, the interchange would also take place at the time that sampling pulses were applied at input terminals 24 and 24', but such interchange would take place through gates 6 and 8' instead of through gates 6' and 8. If both flip-flops 2 and 4 are in the same states, namely, both "0's" or both "1's," then the sampling pulses applied at input terminals 24 and 24' are ineffective to change the state of either flip-flop. It is noted that a bidirectional transfer circuit coupling two bistable devices requires four gates to accomplish interchange of binary information between two bistable devices during a single sampling pulse interval.

Figure 4:
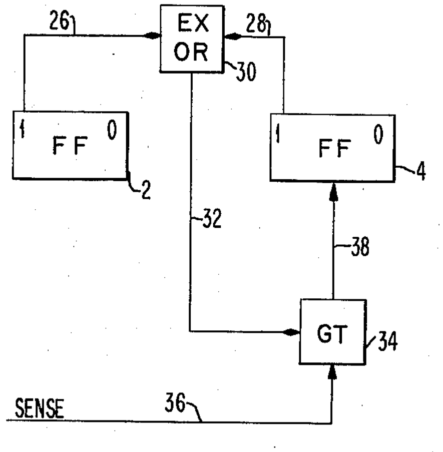
FIG. 4 is a logic circuit embodying the present invention for unilateral transfer of information.
Figure 5:
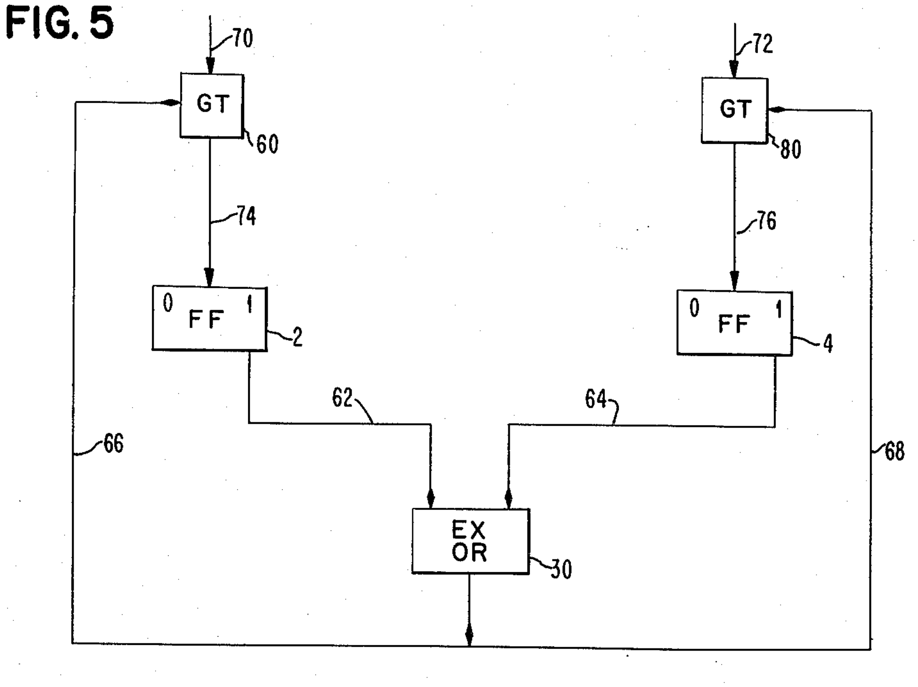
FIG. 5 is a logic circuit embodying the invention for bilateral transfer of information.

Reference will now be had to FIGS. 4 and 5 to teach the invention using an "exclusive OR" circuit to carry out the functions of unilateral and bilateral transfer depicted in FIGS. 1–3. By definition, an "exclusive OR" circuit is one which accepts either of two input signals to yield an output signal but yields no output signal when both input signals are present coincidentally or are both absent. An "exclusive OR" circuit thus distinguishes from an "inclusive OR" circuit which yields an output signal when either or both input signals are present. Where D.C. levels are the input signals to the "exclusive OR" circuit, two positive (+) (D.C. levels as input signals, or two negative (—) D.C. levels as input signals, will prevent a positive D.C. level from appearing at the output terminal of the "exclusive OR" circuit. Under such conditions, the output circuit of the "exclusive OR" circuit will be at a negative potential. Only when the two input D.C. levels to the "exclusive OR" are different, one negative and the other positive, will a positive D.C. level appear at the output terminal of the "exclusive OR" circuit. The "exclusive OR" circuit can be made to operate when only one input signal level appears at its input, rather than two opposing levels.

FIG. 4 shows two flip-flops 2 and 4, whose respective output signals are fed along conductors 26 and 28 to an "exclusive OR" circuit 30. Flip-flops 2 and 4 are each in its "up" state (at a positive D.C. level) when they are in their respective "1" states, but are in the "down" state (at a negative D.C. level) when they are in their respective "0" states. The output signals from the "exclusive OR" circuit 30 are fed as positive D.C. levels along conductor 32 to prime gate 34.

Operation of FIG. 4 will now be described. If it is desired to transfer the binary information from flip-flop 2 to flip-flop 4, gate 34 is sampled by a sense pulse transmitted along conductor 36. If flip-flop 4 is in the "0" state, the "exclusive OR" circuit produces an output signal along output conductor 32 only if flip-flop 2 is in its "1" state. Consequently under such conditions, gate 34 is primed or conditioned, permitting the sense pulse on conductor 36 to be passed along conductor 38 to complement flip-flop 4 to its "1" state, completing the transfer of the "1" in flip-flop 2 to flip-flop 4. Were flip-flop 2 in its "0" state and flip-flop 4 in its "1" state at the time that a sensing pulse were applied along conductor 36, gate 34 would pass such sensing pulse to complement flip-flop 4 to its "0" state, completing the transfer of the "0" in flip-flop 2 to flip-flop 4. It is seen that if both flip-flops 2 and 4 are in the same states, the "exclusive OR" circuit does not produce an output pulse to condition or open gate 34, so no sensing pulse can complement flip-flop 4 to effect a transfer.

The advantage of the unilateral transfer circuit shown in FIG. 4 is that the driver requirements for the register including such flip-flops 2 and 4 are diminished and so are the loading requirements. Moreover, if the "1" sides of the flip-flops 2 and 4 are overloaded (with other circuits such as parity checking circuits), the "exclusive OR" circuit of FIGS. 4 and 5 can be driven by the "0" output terminals of flip-flops 2 and 4.

FIG. 5 is that embodiment of the invention which permits bidirectional transfer of information between flip-flops 2 and 4 using only two gates 60 and 80. Output signals from flip-flops 2 and 4 are fed into the "exclusive OR" circuit via their respective output circuits 62 and 64.

Each output signal from "exclusive OR" circuit 30 traverses feed-back paths 66 and 68 to condition their respective gates 60 and 80. Sensing pulses are applied at input terminals 70 and 72, such sensing pulses being transmitted through conditioned gates 60 and 80 via conductors 74 and 76 to complement their respective flip-flops 2 and 4.

Operation of FIG. 5 will now be described. Assume that flip-flops 2 and 4 are in opposite states with flip-flop 2 in its "1" state and flip-flop 4 in its "0" state. "Exclusive OR" circuit 30 produces an output signal to condition both gates 60 and 80 because the flip-flops 2 and 4 are in opposite states. When sensing pulses are applied to input terminals 70 and 72, they pass through gates 60 and 80, complementing flip-flops 2 and 4 so that flip-flop 2 changes to its "0" state and flip-flop 4 to its "1" state. For a single sensing pulse interval, the binary information in flip-flops 2 and 4 is interchanged. However, were both flip-flops 2 and 4 in the same state, "exclusive OR" circuit 30 would fail to produce an output signal to condition gates 60 and 80 so that sensing pulses appearing at input terminals 70 and 72 would be ineffective to complement either flip-flop.

Figure 6:
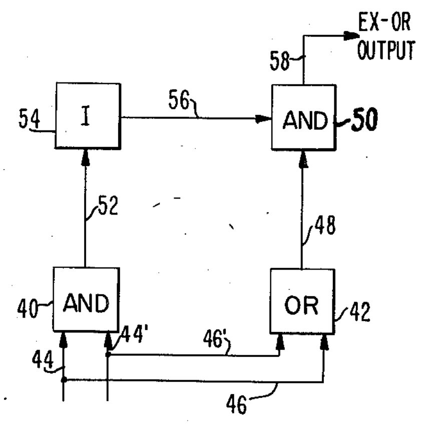
FIG. 6 is an "exclusive OR" circuit employed in the present invention.

An example of the type of "exclusive OR" circuit which can be employed in the practice of the present invention is shown in FIG. 6. And AND circuit 40 and an OR circuit 42 simultaneously receive the same input signals, one signal being fed into the AND circuit along input lead 44 and into the OR circuit along input lead 46, and the other signal entering AND circuit 40 along input lead 44' and OR circuit 42 along input lead 46'. The output of the "OR" circuit is fed along output lead 48 to a second AND circuit 50, whereas the output of AND circuit 40 is fed via output lead 52 to an inverter 54, such inverter 54 producing the AND-NOT function. That is, when there is no input signal along line 52 to the inverter 54, there is an output signal along lead 56, whereas when there is an input signal on lead 52, there is no output signal along output lead 56.

Using D.C. levels for input and output signals, it can be seen that the presence of two input signals on leads 44 and 44' will cause AND circuit 50 to be primed by an output signal from OR circuit 42, but the presence of a signal on input lead 52 will trigger the inverter 54 so that 56 is "down" and no signal appears on input lead 56. Thus two inputs will prevent AND circuit 50 from yielding an output signal along lead 58. However, if only one signal is present (either at input lead 44 or 44'), AND circuit 50 will be primed by an input signal appearing on lead 48, but since no input signal now appears on lead 52, the inverter 54 is operative to produce a signal or D.C. level along lead 56 to prime AND circuit 50. The presence of two D.C. levels as inputs to AND circuit 50 produces an output along lead 58.

Although the circuits shown herein may employ bistable cores, transistors, or tubes, the gates, AND circuits, OR circuits and flip-flops employed herein are of the type shown and described in a copending application entitled "Electronic Digital Computer" by Bernard L. Sarahan et al., Serial No. 414,459, which was filed on March 15, 1954. The inverter used in conjunction with AND and OR circuits to obtain the "exclusive OR" function is shown and described in a copending application entitled "Magnetic Data Storage" by Robert R. Everett et al., Serial No. 494,982, and filed on March 17, 1955.

What is claimed is:

1. A signal transfer circuit comprising a pair of bistable devices, each being capable of assuming two mutually exclusive remanent states, two gates, each gate being in series with a bistable device and adapted when primed to permit the passage of complementing signals therethrough so as to complement its associated bistable device, an "exclusive OR" circuit having two input circuits and a single output circuit, means for connecting each of said bistable devices, when the latter are each in the same remanent state, to said input circuits of said "exclusive-OR" circuit, said single output circuit being connected to each of said gates to provide priming signals thereto.

2. A signal transfer circuit comprising a pair of bistable devices each capable of assuming two mutually exclusive remanent states designated as "0" and "1," a complementing input circuit for each bistable device and being operative only when such bistable device is in its "1" state, two gates, each gate being in series with a bistable device through its complementing input circuit, an "exclusive OR" circuit having two input circuits and a single output circuit, the output circuit of each bistable device being connected to a corresponding input circuit of said "exclusive OR" circuit, and the output circuit of said "exclusive OR" circuit being connected to each gate, such output circuit being adapted to open said gates when a signal pulse appears therein.

3. A signal transfer circuit comprising a pair of bistable devices, each being capable of assuming two mutually exclusive remanent states, two gates, each gate being coupled to a bistable device and adapted, when conducting, to complement its associated bistable device, an output circuit for each bistable device and adapted to produce an output signal when its associated bistable device is in the same predetermined remanent state, an "exclusive OR" circuit having as its inputs the signals appearing in said output circuits, and an output circuit for said "exclusive OR" circuit connected to each gate, said "exclusive-OR" output circuit being adapted to open each of said gating means when an output signal appears in said "exclusive-OR" output circuit.

4. A signal transfer circuit comprising a pair of bistable devices, each being capable of assuming two mutually exclusive remanent states, a gating means in series with only one of said bistable devices and adapted when primed to permit the passage of complementing signals therethrough so as to complement its series connected bistable device, an "exclusive OR" circuit having two input circuits and a single output circuit, means for connecting each of said bistable devices, when the latter are each in the same remanent state, to the input circuits of said "exclusive OR" circuit, said single output being connected to said single gating means to provide priming signals thereto.

5. The transfer circuit as described in claim 4 including means for applying complementing signal pulses to one of said bistable devices through its associated gating means when the latter is primed.

6. A signal transfer circuit comprising a pair of bistable devices, each being capable of assuming two mutually exclusive remanent states, gating means in series with a first of said bistable devices and adapted when primed to permit the passage of complementing signals therethrough so as to complement said first bistable device, an "exclusive-OR" circuit having two input circuits and a single output circuit, means for connecting one of said bistable devices, when the latter are each in the same remanent state, as one of said two input circuits to said "exclusive-OR" circuit, said single output circuit being connected to said gating means to provide priming signals thereto.

References Cited in the file of this patent

UNITED STATES PATENTS

| | | |
|---|---|---|
| 2,695,993 | Haynes | Nov. 30, 1954 |
| 2,792,495 | Carpenter | May 14, 1957 |
| 2,850,647 | Fleisher | Sept. 2, 1958 |
| 2,883,525 | Curtis | Apr. 21, 1959 |